June 3, 1930.    J. G. KNIGHT    1,761,398
OUTLET OR JUNCTION BOX
Filed March 3, 1924    2 Sheets-Sheet 1
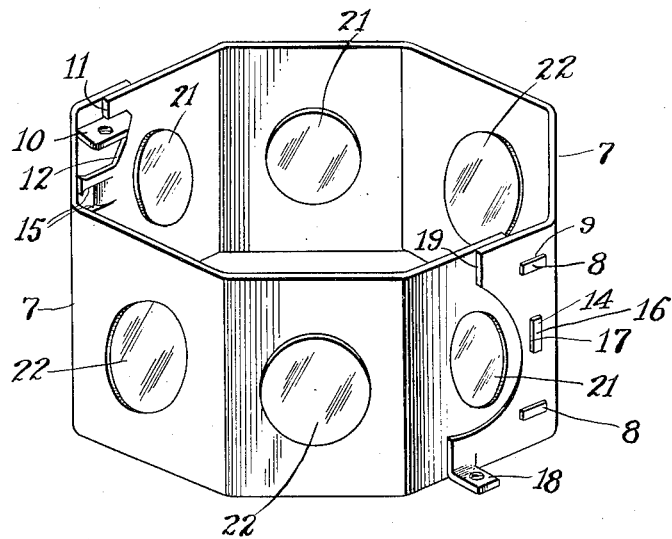
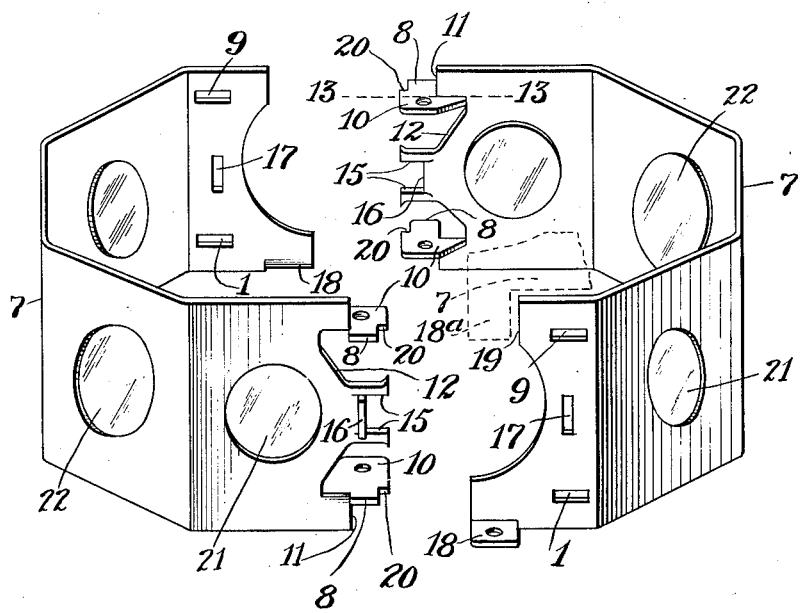
Inventor
Julian Gordon Knight
By his Attorney
Philip S. McLean.

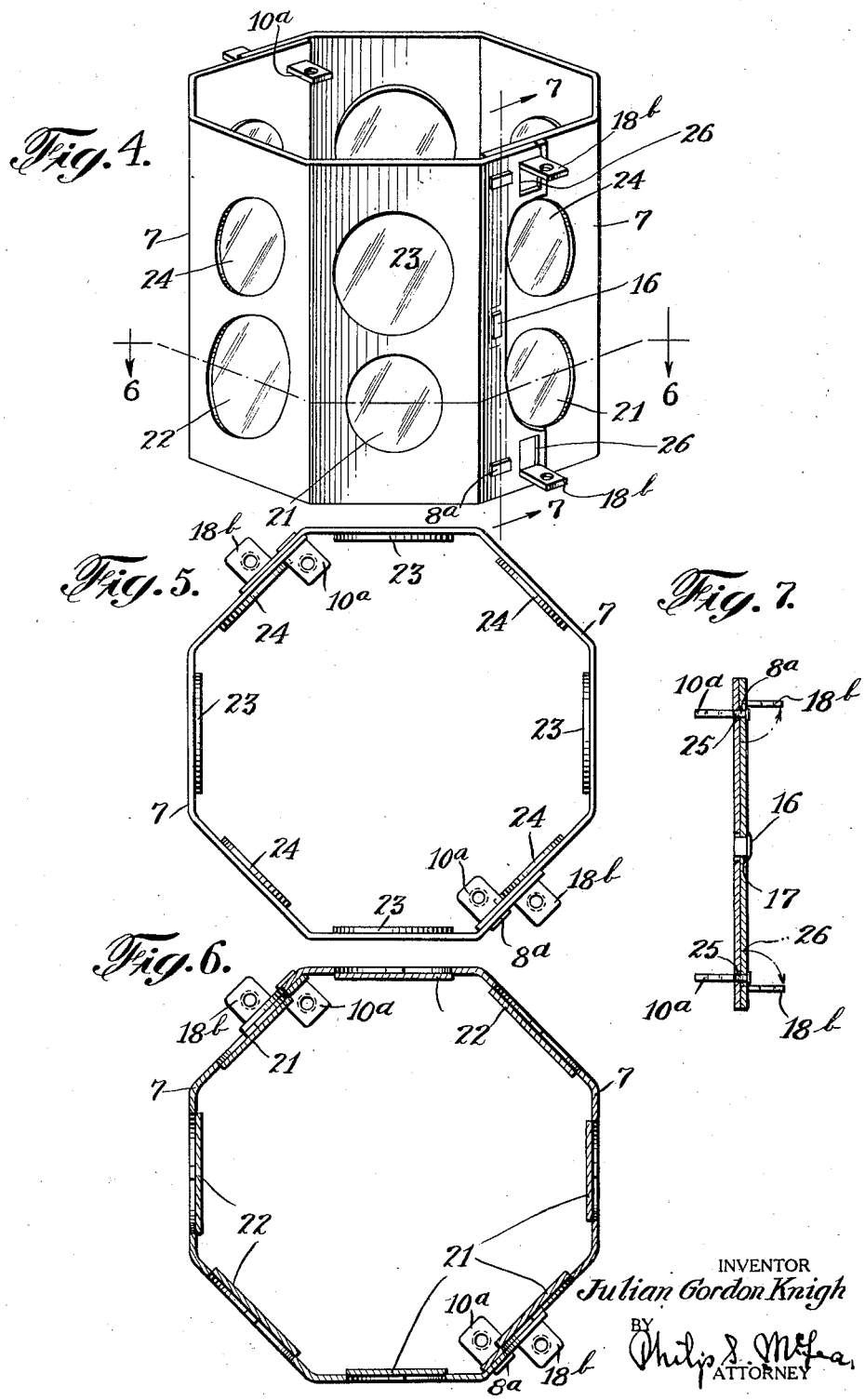

Patented June 3, 1930

1,761,398

UNITED STATES PATENT OFFICE

JULIAN GORDON KNIGHT, OF BROOKLYN, NEW YORK

OUTLET OR JUNCTION BOX

Application filed March 3, 1924. Serial No. 696,478.

The present invention relates to the construction of electrical outlet and junction boxes.

Special objects of the invention are to provide a structure of this sort which will be light and strong and which can be inexpensively produced in sheet metal.

Various other objects of the invention and the novel features of construction, combination and relation of parts which make possible the attainment of the same will appear from the following specification.

The accompanying drawings forming part of the specification illustrate the invention embodied in some of its simplest, practical forms but it should be understood that the structure may be modified without departure from the broad spirit and scope of the invention as hereinafter defined and claimed.

Figure 1 is a perspective view of the peripheral wall or body of the box.

Figure 2 is a similar view of one of the box sections.

Figure 3 is a like view of a companion box section reversed in position to be combined with the first box section.

Figure 4 is a perspective view of a double length box wall.

Figure 5 is a plan view of the same.

Figure 6 is a horizontal sectional view on substantially the plane of line 6—6 of Figure 4.

Figure 7 is a vertical sectional view on substantially the plane of line 7—7 of Figure 4.

In the present disclosures the box wall is made up of two duplicate sections 7, formed of sheet metal and secured together at their ends to provide an actagonal box enclosure.

To provide close joints, the meeting ends of the box sections are secured in overlapping relation and in the first form of the invention the fastening is effected by integral lugs 8 struck out from the inside end portion and extending through openings 9 in the outside end portions.

In similar fashion the screw receiving lugs 10 are formed integrally with the wall sections and bent inward in position to receive the screws by which the covers or box ends are secured in place.

A special feature of the securing and screw lugs is that they are formed one as a continuation of the other so that one has the effect of bracing or strengthening the other. In the illustration this is accomplished by cutting the metal inward from the opposite edges at one end of the box wall, as indicated at 11, to provide the metal for the fastening lugs and forming combined longitudinally and transversely extending cuts 12 into the end of the wall section, forming a partly severed piece of metal which when twisted about the axis 13 into a rectangular plane, provides an outwardly projecting fastening lug and as a continuation of that, an inwardly projecting screw lug.

The securing lugs 8 are preferably headed over after the manner of rivets, as indicated at 14 in Figure 1. These rivet fastenings are usually disposed near the upper and lower ends of the box body and if desired, an intermediate rivet fastening may be provided between the two mentioned. These intermediate fastenings are of particular value where the boxes are of extra length and they are shown provided in the present disclosure by making two parallel longitudinal cuts 15 in the intermediate end portion of the section and bending out a vertically extending lug 16 for engagement in a correspondingly placed vertical slot 17 in the companion wall section.

As shown in Figures 2 and 3 each box section may thus be formed with outwardly projecting rivet lugs and inwardly extending screw lugs at one end and at the other end with properly positioned openings to receive the out-struck lugs of the companion section. These lugs and openings may be formed by simple cutting and shaping dies.

Positioning lugs 18 may be provided to receive nails or other fastenings for securing the boxes in desired position on the forms. These lugs are shown provided by rectangular extensions at the end edges of the sections, as indicated in broken lines at 18ª in Figure 2 which shows how the metal for the lug on one section is taken out of the corner at 19 of the adjoining section when the strips from which the box sections are made are blanked out of the sheet metal. This method of construction saves any waste of metal.

When the box sections are blanked out and shaped up as in Figure 2, they can be quickly assembled by simply taking two of the sections disposed in reversed end to end relation, as in Figures 2 and 3 and, after lapping the ends, shifting them transversely to project the rivet lugs at the inside through the outer portions of the lapped joints, after which the lugs can be headed over by suitable riveting mechanism. When so secured, the box sections are firmly and permanently fastened together, with the joints closed by overlapping parts and the rivet lugs by their anchorage in the outer walls, brace and strengthen the screw lugs so that they will not become bent or broken in the rough handling to which these boxes are ordinarily subjected. The rivet lugs are shown as having shoulders 20 at their edges which are disposed toward the end of the section and in line with the outside surface of the section, which act as stops positioning the screw lugs at the back and preventing said lugs from being drawn outward or twisted out of position during the riveting operations.

The side wall of the box will usually be provided with suitable knock-outs. Preferably the box is of octagonal shape, provided with knock-outs in all of its angularly related sides and arranged in the manner disclosed in my patent # 1,471,340, that is, with a combination of large and small size knockouts for different sizes of conduit arranged preferably with three of one size in one group, with another of this same size directly opposite and the knock-outs of the other size grouped in pairs at opposite sides of the single knock-out.

In the double length form of box illustrated in Figures 4 to 7, this arrangement of knockouts is provided at one end of the box, (lower end in Figure 4) that is, three knockouts of one size in one group and a single knockout of the same size directly opposite, all designated 21, (Figures 4 and 6) with a pair of the knockouts of the other size at each side of the single knockout, designated 22; while at the opposite end of the box a series of alternately arranged large and small size knockouts 23, 24 are provided. This box wall is reversible end for end, so that by using one end or the other the box may be adapted for use with practically any combination of large and small size conduit grouping.

The combined rivet-screw lugs 8ª, 10ª, are shown formed one as a continuation of the other, but in this instance, instead of being integral with the box wall they are indicated as separately made units with the shanks of the rivet lugs inserted through alined openings 25 in the box sections and headed over at the outside of the box.

Also in this construction the positioning lugs 18ᵇ are shown cut out of the body of the section at 26 and bent outward, instead of being made as extensions on the edges of the sections.

What is claimed is:

1. A side wall for outlet boxes and the like having overlapping end portions, one of such portions having a corner section of the same partially severed and bent out at an angle, said section having a shoulder at the angle, said section having a shoulder at the outer end edge of the same substantially in line with the outer face of said end portion to act as a stop for the other end portion and the other end portion provided with an opening through which the bent-out lug is projected to the limit permitted by said stop.

2. A side wall for outlet boxes and the like having overlapping end portions with an integral angularly projecting screw lug on one portion reinforced by an integral oppositely extending tongue, said other end portion having an aperture and said tongue projecting through said aperture and fastened over the opposite end portion.

3. A side wall for outlet boxes and the like having lugs cut from the opposite edges of the same, co-extensive oppositely extending lugs cut from intermediate portions between the edges, each coextensive pair of such lugs extending substantially at right angles to the wall and forming projections at the opposite sides of the wall and a companion part in overlapping relation having openings through which the lugs at one side of the wall project.

4. As an article of manufacture, a sheet metal wall section for outlet boxes and the like having portions at one end of the same, cut on laterally offset lines in opposite directions toward a common line and twisted about said common line to provide co-extensive lugs projecting from the opposite faces of the wall section.

5. As an article of manufacture, a sheet metal wall section for outlet boxes and the like having portions at one end of the same, cut on laterally offset lines in opposite directions toward a common line and twisted about said common line to provide co-extensive lugs projecting from the opposite faces of the wall section and said wall section having an opening in its opposite end corresponding in size to the outwardly projecting lug.

6. As an article of manufacture, a sheet metal wall section for outlet boxes and the like having portions at one end of the same, cut on laterally offset lines in opposite directions toward a common line and twisted about said common line to provide co-extensive lugs projecting from the opposite faces of the wall section and an intermediate lug cut from the material adjacent the lugs described and bent angularly to project from one face of the wall section.

7. As an article of manufacture, a sheet metal wall section for outlet boxes and the like having portions at one end of the same, cut on laterally offset lines in opposite directions toward a common line and twisted about said common line to provide co-extensive lugs projecting from the opposite faces of the wall section and an intermediate lug cut from the material adjacent the lugs described and bent angularly to project from one face of the wall section, the wall section having at the opposite end of the same, openings of a size corresponding to said intermediate and outwardly projecting lugs.

8. An outlet box wall having overlapping portions and integrally formed co-extensive lugs on one portion, the other portion having an opening therein, one of said lugs extending through the opening in the overlapping portion of the box wall and headed over to rivet the overlapping portions together and the other lug projecting in the opposite direction beyond the wall and braced in such projecting relation by the rivet lug.

9. An outlet box wall having overlapping portions and having a securing element partially severed from one of such overlapping portions and the other portion having an opening for said securing element, said securing element being extended through said opening in the companion overlapping portion and headed over to form a rivet, that section of the first overlapping portion from which such rivet lug has been removed, being covered over by the companion overlapping portion.

10. A peripheral wall for outlet boxes and the like, said wall having coextensive portions severed therefrom and projecting in opposite directions from a line joining the severed portions and the two portions being bent about said line to form reversely projecting lugs standing out at opposite sides of the wall, one of said lugs having a screw seat therein and the other lug forming an integral rivet for securing the end portions of the wall together.

11. A peripheral wall for outlet boxes and the like, said wall having overlapping end portions, one of such end portions having reversely extending lugs partially severed from that portion and bent in opposite directions about a transverse line connecting the severed sections and forming reversely projecting lugs extending from the opposite sides of said wall portion, the other end portion having a seat for one of said projecting lugs, said lug projecting entirely through said seat and headed over to thereby rivet the overlapping end portions together and the other reversely projecting lug having a seat for a fastening.

12. A peripheral wall for outlet boxes and the like, said wall having an integral lug portion severed from one edge of the wall and a second lug portion coextensive with the base of the first lug portion and severed from an intermediate portion of the wall up to a line joining the base portions of the two lugs and said two lugs being bent about said line away from the wall in opposite directions and thereby providing integral oppositely projecting fastening extensions at the opposite sides of the box wall.

13. A side wall for outlet boxes or the like, having overlapping end portions, one of said end portions having a part of the same partially severed and bent out at substantially a right angle to form a projecting lug, said lug having a screw seat therein and provided with an integral oppositely projecting portion extending from the opposite face of the wall substantially at right angles to form a rivet lug, said rivet lug being narrower than said screw seat lug and a shoulder being provided at the junction of said narrower rivet lug with the wider screw seat lug substantially in line with the face of the wall, the other end portion having a slot approximating the length and width of said rivet lug and positioned to receive the same, said rivet lug projecting through said slot to the extent permitted by said abutment shoulder and said lug being headed over as a rivet with said abutment shoulder forming one of the heads of said integral rivet.

14. A peripheral wall for outlet boxes and the like, said wall having overlapping end portions, one of such end portions having reversely extending lugs partially severed from that portion and bent in opposite directions about a transverse line connecting the severed sections and forming reversely projecting lugs extending from the opposite sides of said wall portion, the other end portion having a seat for one of said projecting lugs, said lug projecting entirely through said seat and headed over to thereby rivet the overlapping end portions together and the other reversely projecting lug having a seat for a fastening.

15. A side wall for outlet boxes or the like, said wall having co-extensive lug portions severed therefrom in offset relation and projecting in opposite directions from a line joining said co-extensive severed portions and said two lug portions being bent about said line to form reversely projecting lugs standing out at the opposite sides of said wall.

16. A side wall for outlet boxes and the like, said side wall having a corner section of the same cut down from one side edge to provide a partially severed lug and cut inward from the end below said lug portion to a point beyond the first cut and on an approximate line with the termination of said first cut to provide a second partially severed lug co-extensive with the base of the first lug, said two partially severed co-extensive lugs being bent about the base line joining the severed portions to form reversely projecting lugs standing out at opposite sides of the wall.

17. A side wall for outlet boxes and the like, said side wall having a corner section of the same cut down from one side edge to provide a partially severed lug and cut inward from the end below said lug portion to a point beyond the first cut and on an approximate line with the termination of said first cut to provide a second partially severed lug co-extensive with the base of the first lug, said two partially severed co-extensive lugs being bent about the base line joining the severed portions to form reversely projecting lugs standing out at opposite sides of the wall, one of said projecting lugs being narrower than the other lug thereby providing a shoulder at the base of said lug on the line of juncture between the two lugs to enable said lesser width lug to be utilized as a rivet having said shoulder as a stop.

18. As an article of manufacture, a sheet metal box wall having overlapping end portions and co-extensive rivet and fastening receiving lugs integrally connected together with one forming a continuation of the other, the rivet lug being shorter and narrower than the fastening receiving lug and having a stop shoulder on the line of integral connection with the fastening receiving lug, one of the overlapping portions lying against said shoulder and said rivet lug projecting from its line of connection with the fastening receiving lug through said overlying wall portion and whereby the overlapping wall portions are rigidly secured together by integrally continuous rivet and fastening member lugs, with said fastening member lug braced in outstanding relation projecting from one face of the side wall by said integral rivet lug.

19. As an article of manufacture, a sheet metal wall section for outlet boxes and the like, said wall section having a lateral extension at one end corner and said lateral extension of the end corner being bent angularly out from the plane of the wall to provide a positioning lug projecting from the base of the wall section to enable the anchoring of the completed outlet box in proper position, said wall section having a recess in the opposite end corner of the same corresponding in size and shape to the laterally projecting corner lug extension and whereby the metal necessary for the corner lug extension of one wall section may be taken out of the corner recess of an adjoining wall section blank, without waste of material.

In witness whereof, I have hereunto set my hand this 11th day of February, 1924.

JULIAN GORDON KNIGHT.